United States Patent
Delpont et al.

(10) Patent No.: US 10,329,446 B2
(45) Date of Patent: Jun. 25, 2019

(54) INK COMPRISING SILVER NANOPARTICLES

(71) Applicant: Genes'Ink SA, Rousset (FR)

(72) Inventors: Nicolas Delpont, Venelles (FR); Corinne Versini, Aix en Provence (FR); Virginie El Qacemi, Roquevaire (FR); Gregoire Staelens, Aix en Provence (FR); Louis-Dominique Kauffman, La Crau (FR)

(73) Assignee: Genes'ink SA, Rousset (FR)

( * ) Notice: Subject to any disclaimer, the term of this patent is extended or adjusted under 35 U.S.C. 154(b) by 0 days.

(21) Appl. No.: 15/574,791

(22) PCT Filed: May 19, 2016

(86) PCT No.: PCT/EP2016/061318
§ 371 (c)(1),
(2) Date: Nov. 16, 2017

(87) PCT Pub. No.: WO2016/184979
PCT Pub. Date: Nov. 24, 2016

(65) Prior Publication Data
US 2018/0142113 A1    May 24, 2018

(30) Foreign Application Priority Data

May 20, 2015  (FR) ...................................... 15 01042
Oct. 1, 2015   (FR) ...................................... 15 02042

(51) Int. Cl.
*C09D 11/52*    (2014.01)
*B41M 1/22*    (2006.01)
(Continued)

(52) U.S. Cl.
CPC ............... *C09D 11/52* (2013.01); *B41M 1/22* (2013.01); *B82Y 30/00* (2013.01); *C09D 11/033* (2013.01);
(Continued)

(58) Field of Classification Search
None
See application file for complete search history.

(56) References Cited

U.S. PATENT DOCUMENTS

2014/0051242 A1* 2/2014 Lockett ................ H01L 21/288
                                                         438/610

FOREIGN PATENT DOCUMENTS

EP    1339073 A1    8/2003
EP    1571186 A1    7/2005
(Continued)

OTHER PUBLICATIONS

International Search Report and Written Opinion for PCT/EP2016/061318, dated Jul. 6, 2016, 21 pages.
(Continued)

*Primary Examiner* — Katie L. Hammer
(74) *Attorney, Agent, or Firm* — Moss & Barnett; Michael A. Bondi (57) ABSTRACT

The present invention relates to formulations for ink based on nanoparticles of silver. In particular, the present invention concerns formulations of ink based on nanoparticles of silver, which inks are stable, have an improved conductivity and are adapted for the area of serigraphy.

18 Claims, 1 Drawing Sheet

Improved resolution: better defined image (51) Int. Cl.
 *B82Y 30/00* (2011.01)
 *C09D 11/033* (2014.01)
 *C09D 11/037* (2014.01)
 *C09D 11/38* (2014.01)
 *C09K 13/00* (2006.01)

(52) U.S. Cl.
 CPC ............ *C09D 11/037* (2013.01); *C09D 11/38* (2013.01); *C09K 13/00* (2013.01)

(56) References Cited

FOREIGN PATENT DOCUMENTS

| EP | 2236565 A1 | 6/2010 |
|----|-----------|--------|
| EP | 2763141 A2 | 6/2014 |
| WO | 2010101418 A2 | 9/2010 |

OTHER PUBLICATIONS

International Preliminary Report on Patentability for PCT/EP2016/061318, dated Nov. 21, 2017, 8 pages.

* cited by examiner

Improved resolution: better defined image

INK COMPRISING SILVER NANOPARTICLES

REFERENCE TO RELATED APPLICATION

The present application claims priority to PCT Application No. PCT/EP2016/061318, filed May 19, 2016, which claims priority to French Application No. 1501042, filed May 20, 2015, and French Application No. 1502042, filed Oct. 1, 2015, the contents of which is incorporated herein by reference in its entirety.

FIELD OF THE INVENTION

The present invention relates to formulations for ink based on nanoparticles of silver. In particular, the present invention concerns formulations of ink based on nanoparticles of silver, which inks are stable and have an improved conductivity.

Similar inks have already been described by the Applicant in its patent application PCT/EP2014/075415 filed on Nov. 24, 2014.

More particularly, the present invention concerns formulations of ink based on nanoparticles of silver, which inks are characterized by a series of improved properties among which we cite by way of illustration:

A better annealing (homogeneity of the deposition), and/or

An absence of a generation of bubbles/foams during the printing, and/or

A better dwell time (for example, no drying of the ink on the mask), and/or

An excellent conductivity after drying at ambient temperature.

More particularly, the present invention relates to the area of inks based on conductive nanoparticles adapted for serigraphy, blade coating, pad printing and/or engraving (offset).

The inks based on conductive nanoparticles according to the present invention can be printed on all types of supports. The following supports are cited by way of example: polymers and derivatives of polymers, composite materials, organic materials, inorganic materials.

The inks based on conductive nanoparticles according to the present invention have numerous advantages, among which we cite by way of non-limiting examples:

a stability in time superior to current inks;

a non-toxicity of solvents and of nanoparticles;

a conservation of the intrinsic properties of the nanoparticles; and, in particular, an improved conductivity for annealing temperatures generally comprised between 150° C. and 300° centigrade; and/or an excellent conductivity after drying at ambient temperature.

The present invention also relates to a method for the improved preparation of these inks; finally, the present invention also relates to the use of these inks in the areas of serigraphy, blade coating, pad printing and/or engraving (offset).

BACKGROUND OF THE INVENTION

In the literature of recent years conductive, colloidal nanocrystals have received much attention on account of their new optoelectronic, photovoltaic and catalytic properties. This makes them particularly interesting for future applications in the area of nanoelectronics, solar cells, sensors and biomedicine.

The development of conductive nanoparticles allows the use of new implementations and the envisioning of a multitude of new applications. Nanoparticles have a very significant surface/volume ratio and the substitution of their surface by surfactants brings about the changing of certain properties, in particular optical ones, and the possibility of dispersing them. Their small dimensions can bring about in certain instances effects of quantic confinement. The term nanoparticles is used when at least one of the dimensions of the particle is lower than or equal to 250 nm. The nanoparticles can be spheres (from 1 to 250 nm), small rods (L<200 to 300 nm), threads (several hundreds of nanometers or even several microns), disks, stars, pyramids, tetrapods, cubes or crystals when they do not have a predefined shape.

Several processes have been worked out in order to synthesize conductive nanoparticles. Among them, the following can be cited in a non-exhaustive manner:

physical processes:

The deposition of chemical vapor (also known by the name "Chemical Vapor Deposition—CVD" when a substrate is exposed to volatilized chemical precursors which react or decompose on its surface. This process generally leads to the formation of nanoparticles whose morphology depends on the conditions used;

Thermal evaporation;

Epitaxy by molecular jets (also known by the name "Molecular Beam Epitaxy") when atoms which will constitute the nanoparticles are bombarded at a high speed on the substrate (where they become fixed) in the form of a gaseous flux;

chemical or physicochemical processes:

Microemulsion;

Laser impulsion in solution when a solution containing a precursor is radiated by laser beam. The nanoparticles are formed in the solution along the luminous beam;

Synthesis by radiation with microwaves;

Oriented synthesis assisted by surfactants;

Synthesis under ultrasounds;

Electrochemical synthesis;

Organometallic synthesis;

Synthesis in an alcoholic environment.

The physical syntheses consume more raw materials with significant losses. They generally necessitate time and elevated temperatures, which makes them not very attractive for being used in a production on an industrial scale. This makes them not able to be adapted to certain substrates, for example, flexible substrates. Furthermore, the syntheses are carried out directly on the substrates in frames with reduced dimensions. These production modes prove to be relatively rigid and do not allow a production on substrates of large dimensions; however, they can be perfectly suited for the production of nanoparticles of silver used in formulations for ink according to the present invention.

As for the chemical syntheses, they have numerous advantages. The first one is the working in solution, wherein the conductive nanoparticles obtained in this manner are already dispersed in a solvent, which facilitates the storage and the use. In the majority of cases the nanoparticles are not fixed to a substrate at the end of the synthesis, which leads to greater latitude in their use. This opens the way to using substrates of different sizes and of different natures. These methods also allow a better control of the raw materials used and limits losses. A good adjustment of the synthesis parameters results in a good control of the synthesis and of the kinetics of the growth of the conductive nanoparticles. This allows a good reproducibility between the lots to be guaranteed as well as a good control of the final morphology of the nanoparticles. The ability to produce nanoparticles rapidly and in a great quantity with a chemical pathway while guaranteeing a certain flexibility to the product allows a production on an industrial scale to be envisioned. The obtention of dispersed, conductive nanoparticles opens numerous perspectives regarding their customization. Therefore, it is possible to adjust the nature of the stabilizers present on the surface of the nanoparticles according to the intended application. In fact, there are different methods of deposition using a moist pathway. In each case, particular attention must be given to the physical properties of the inks such as the surface tension or the viscosity. The adjuvants used during the formulation of the ink based on nanoparticles will allow adherence to the requirements of the deposition method. However, the surface ligands will also impact these parameters and their selection proves to be decisive. It is therefore important to have a view of the entirely of the ink in order to combine all the actors—nanoparticles, solvent, ligands and adjuvants—and to obtain a product compatible with the intended applications.

SUMMARY OF THE INVENTION

The present invention has the goal of palliating one or more disadvantages of the prior art by supplying an ink adapted to serigraphy and/or to engraving (offset) and preferably comprising a dispersion of silver nanoparticles that are stable and in a heavy concentration. These inks are characterized by a set of improved properties among which we will cite by way of illustration:

A better annealing (homogeneity of the deposition), and/or

An absence of a generation of bubbles/foams during the printing, and/or

A better dwell time (for example, no drying of the ink on the mask), and/or

An excellent conductivity after drying at ambient temperature.

The present invention therefore comprises an ink whose composition comprises at least
1. a compound "a" consisting of silver nanoparticles,
2. a compound "e" consisting of a mixture of solvents, and
3. at least one compound "f" and/or "g" selected from
   a. a compound "f" consisting of a rheology-modifying agent of the urea type, and
   b. a compound "g" consisting of a rheology-modifying agent of the cellulose type,
4. an optional compound "c" consisting of a dispersing agent,
5. An optional compound "d" consisting of a dispersing agent different from the compound "c",
6. an optional compound "b" consisting of a cyclo-octane solvent and/or a solvent of the ester methyl type of fatty acids, and/or a mixture of two or more of these solvents,
7. an optional compound "h" consisting of an antioxidant agent in a content lower than 10% by weight, and
8. an optional additional solvent "X" preferably selected from the alkanes and/or their mixtures,
characterized in that
A. the compound "a" constitutes at least 40% by weight of the ink composition, B. The compound "e" consists of at least one terpenic alcohol that constitutes at least 20% by weight of the ink composition and of at least one polyol (and/or a derivative of polyol) which constitutes at least 5% by weight and at the most 25% by weight of the ink composition, and C. the sum of the compositions "a", "b", "c", "d", "e", "f", "g", "h" and "X" constitutes at least 85% by weight of the ink composition.

DETAILED DESCRIPTION OF THE INVENTION

The viscosity of the ink according to the present invention is generally comprised between 10 and 10,000 mPa·s, preferably between 100 and 5000 mPa·s, for example between 200 and 2500 mPa·s, for example between 400 and 2000 mPa·s.

The Applicant discovered that the ink composition based on silver nanoparticles according to the present invention with the combination of compounds claimed and of their respective concentration permitted the obtention of an ink with improved properties, in particular an improved stability and an improved conductivity in a range of viscosities particularly adapted for uses in the areas of serigraphy, blade coating, pad printing and/or engraving (offset); in particular, the formulations of ink based on silver nanoparticles according to the present invention present a set of improved properties among which we will cite by way of illustration:

A better annealing (homogeneity of the deposition), and/or

An absence of a generation of bubbles/foams during the printing, and/or

A better dwell time (for example, no drying of the ink on the mask), and/or

An excellent conductivity after drying at ambient temperature.

The inks based on conductive nanoparticles according to the present invention can be printed on all types of supports. The following supports are cited by way of example: polymers and derivatives of polymers, composite materials, organic materials, inorganic materials. The fact that the ink according to the present invention can be used at ambient temperature also allow its field of use in usable support material to be enlarged. We will cite by way of illustration:

Printing on plastic material (Tg<60° C.), for example PVC (for example food films), and/or polystyrene, Printing on chalky paper or non-chalky paper, Printing of a biological substrate (for example organic tissues and/or vegetable tissues), The realizing of biosensors, and/or Printing on bulky items (for example walls, large-size plastic items, etc.)

The compound "a" according to the present invention therefore consists of silver nanoparticles.

According to an embodiment of the present invention the subject matter of the present invention is achieved particularly well when the compound "a" is constituted by silver nanoparticles whose dimensions are comprised between 1 and 250 nm. The size of the nanoparticles is defined as being the average diameter of the particles containing the silver with the exclusion of stabilizers such as determined, for example, by electronic microscopy by transmission.

According to an embodiment of the present invention the silver nanoparticles have a spheroidal and/or spherical shape. For the present invention in the following claims the term "spheroidal shape" signifies that the shape resembles that of a sphere but that it is not perfectly round ("quasi-spherical"), for example, an ellipsoidal shape. The form of the nanoparticles is generally identified by means of photographs taken by microscope. Therefore, according to this embodiment of the present invention the nanoparticles have diameters comprised between 1 and 250 nm.

According to an embodiment of the present invention the silver nanoparticles have the shape of spheres (from 1 to 250 nm), of small rods (L<200 to 300 nm), threads (several hundreds of nanometers or even several microns), cubes, platelets or crystals when they do not have a predefined shape.

According to a particular embodiment of the present invention the silver nanoparticles were previously synthesized by physical synthesis or chemical synthesis. Any physical or chemical synthesis can be used in the framework of the present invention. In a particular embodiment according to the present invention the silver nanoparticles are obtained by a chemical synthesis which uses an organic or inorganic salt of silver as silver precursor. The following are cited by way of non-limiting example: silver acetate, silver nitrate, silver carbonate, silver phosphate, silver trifluorate, silver chloride, silver perchlorate, alone or in a mixture. According to a variant of the present invention the precursor is silver acetate.

According to a particular embodiment of the present invention the silver nanoparticles are synthesized by chemical synthesis, by reduction of the silver precursor by a reducing agent in the presence of a dispersing agent, called in the following the compound "c"; this reduction can be carried out in the absence of or in the presence of a solvent (also called in the following the "synthesis solvent"). When the synthesis is carried out in the absence of solvent the dispersing agent generally acts simultaneously as a dispersing agent and as solvent of the precursor of silver; a particular example of the synthesis of nanoparticles in an environment without solvent and for the preparation of the dispersion according to the present invention is described below by way of illustration.

An example of the preparation of the dispersion of nanoparticles in the solvent "b": the synthesis dispersing agent (compound "c"; for example, dodecylamine) is added in excess in a reactor containing silver acetate and the mixture is agitated. The reducing agent hydrazine is then added rapidly to the mixture and the entirety is left under agitation for about 60 minutes. The mixture is treated by the addition of methanol (or of any other appropriate solvent, for example, a monohydric alcohol with 2 to 3 carbon atoms, for example ethanol) and the supernatant is eliminated during the course of several successive washings (the silver nanoparticles formed in this manner therefore remain in the dispersion state and in liquid contact). The solvent cyclo-octane (compound "b") is added and the residual methanol is evaporated. The compound "d" (a dispersing agent different from the compound "c" used; for example an octyl amine) is then added and the mixture is agitated for 15 minutes at ambient temperature. The dispersions of silver nanoparticles obtained in this manner are directly used for the formulation of conductive inks.

The synthesis solvent is, for example, an organic solvent selected from the following list of hydrocarbons:
  alkanes with 5 to 20 carbon atoms for which the following can be cited by way of illustration: pentane (C5H12), hexane (C6H14), heptane (C7H16), (C8H18), nonane (C9H20), decane (C10H22), undecane (C11H24), dodecane (C12H26), tridecane (C13H28), tetradecane (C14H30), pentadecane (C15H32), cetane (C16H34), heptadecane (C17H36), octadecane (C18H38), nonadecane (C19H40), eicosane (C20H42), cyclopentane (C5H10), cyclohexane (C6H12), methylcyclohexane (C7H14), cycloheptane (C7H14), cyclooctane (C8H16) (preferably when it is not used as compound "b"), cyclononane (C9H18), cyclodecane (C10H20);
  the aromatic hydrocarbons with 7 to 18 carbon atoms of which toluene, xylene, ethylbenzene and ethyltoluene are cited by way of illustration;
  and their mixtures.

According to an embodiment of the present invention at least one dispersing agent (the compound "c") is also present in addition to the precursor of silver—and to the synthesis solvent (when the latter is used). This dispersing agent, which we will call a synthesis dispersing agent, therefore corresponds to the compound "c" defined below and is preferably selected from the list of dispersing agents described in the following in the present specification.

According to an embodiment of the present invention the silver nanoparticles are therefore synthesized by chemical synthesis, by reduction of the precursor of silver by means of a reducing agent in the presence of the synthesis dispersing agent (the compound "c"), all of which is preferably performed in the synthesis solvent. This synthesis is preferably performed under non-limiting conditions of pressure and of temperature as defined in the following in the present specification.

The reducing agent can be selected from a large range of compounds allowing the reduction of the precursor of silver. The following compounds are cited by way of illustration: hydrogen; hydrides, among which we cite by way of example NaBH4, LiBH4, KBH4 and the borohydride of tetrabutyl ammonium; the hydrazines, among which we cite by way of example the hydrazine (H2N—NH2), substituted hydrazine (methyl hydrazine, phenyl hydrazine, dimethyl hydrazine, diphenyl hydrazine, paramethoxyphenyl hydrazine, etc.), hydrazine salt (substituted), etc.; amines, among which we cite by way of example trimethylamine, triethylamine, etc.; and their mixtures.

In general, after the reduction step the nanoparticles are then subjected to a washing/purification step which allows everything that is not chemically or physically connected to the nanoparticles to be eliminated.

According to a particular embodiment of the present invention a liquid phase is always present at the time of the reduction step of the precursor of silver and during all the steps (for example, the steps of washing and purification mentioned above) which precede the addition of the compound "b". In other words, a preferred characteristic according to the present invention consists in that the silver nanoparticles are never isolated and dried; they therefore remain in this particular embodiment in contact with a liquid phase (for example a solvent) in which they are dispersed. As demonstrated above in the specification, this characteristic allows a considerable improvement of certain properties (monodispersion, homogeneity, stability and annealing at a lower temperature) of the silver nanoparticles. This approach allows the elimination of the step of the isolation of the nanoparticles, which has a positive impact in terms of production costs and of the hygiene and safety of persons.

According to an embodiment of the present invention, before its use in the formulation of the ink the compound "a" is advantageously dispersed in a dispersion solvent (compound "b" defined below). When the dispersion solvent is used, the synthesis solvent of the nanoparticles cited above is generally different from this dispersion solvent. The compound "b" according to the present invention consists, for example of a cyclo-octane solvent and/or a solvent of the methylic ester of the fatty acids type, and/or a mixture of both or of several of these solvents.

The solvent of the type of methylic ester of fatty acids is preferably a short hydrocarbon chain; for example, a chain comprising between 4 and 8 carbon atoms. Cited examples are methyl butanoate, methyl hexanoate and/or methyl octanoate.

According to an embodiment of the present invention a second dispersing agent (called compound "d" in the following) is also used as a complement of the silver nanoparticles before the formulation of the ink; the addition of the second dispersing agent (compound "d") generally takes place after the synthesis of the nanoparticles, for example during the above-mentioned dispersion step. The compound "c" (synthesis dispersing agent) and "d" (dispersion dispersing agent) according to the present invention therefore consist of dispersing agents characterized in that the dispersing agent "d" is different from the agent "c" used. This difference is displayed by a different chemistry; we cite by way of illustration a different length of carbon chain (for example, a difference of at least two atoms of carbon in the chain), and/or one compound with a linear carbon chain and the other one not with a linear carbon chain, and/or a compound with a cyclic carbon chain in the other one not with a cyclic carbon chain, and/or a compound with an aromatic carbon chain and the other one not with an automatic carbon chain. According to a preferred embodiment of the present invention the compound "c" has a molecular mass and a carbon chain length of at least 20% greater than that of the compound "d", for example at least 40% greater.

These dispersing agents can advantageously be selected from the families of organic dispersing agents which comprise at least one atom of carbon. These organic dispersing agents can also comprise one or more non-metallic heteroatoms such as a halogenated compound, nitrogen, oxygen, sulfur, silicon.

The following are cited by way of illustration: the thiols and their derivatives (for example the amino alcohols and the ethers of amino alcohols), the carboxylic acids and their carboxylate derivatives, the polyethylene glycols, and/or their mixtures.

In an embodiment of the present invention the organic dispersing agents "c" and "d" will be selected from the group constituted by the amines such as, for example propylamine, butylamine, pentylamine, hexylamine, heptylamine, octylamine, nonylamine, decylamine, undecylamine, docecylamine, tridecylamine, tetradecylamine, hexadecylamine, diaminopentane, diaminohexane, diaminoheptane, diaminooctane, diaminononane, diaminodecane, dipropylamine, dibutylamine, dipentylamine, dihexylamine, diheptylamine, dioctylamine, dinonylamine, dedecylamine, methylpropylamine, ethylpropylamine, propylbutylamine, ethylbutylammine, ethylpentylamine, propylpentylamine, butylpentylamine, tributylamine, trihexylamine, or their mixtures.

According to a particular embodiment of the present invention the compounds "b" and "d" are added to the already synthesized silver nanoparticles in the presence of the compound "c".

This addition generally takes place after the stages of washing/purification of the nanoparticles as described in the present specification.

A particular example of the synthesis of nanoparticles and of the preparation of the corresponding dispersion according to a particular embodiment of the present invention is described by way of illustration below:

Preparation of the Dispersion of Nanoparticles in the Solvent "b":

The synthesis dispersing agent (compound "c"; for example dodecyl amine" is added into a reactor containing silver acetate in toluene (the synthesis solvent) and the mixture is agitated.

The reducing agent hydrazine is then added rapidly mixture and the mixture is left under agitation for approximately 60 minutes. The mixture is treated by the addition of methanol (or of any other appropriate solvent, for example another monohydric alcohol with 2 to 3 carbon atoms, for example ethanol) and the supernatant is eliminated during the course of three successive washings (the silver nanoparticles formed in this manner therefore remain in the state of dispersion and in contact with liquid, in this instance in contact with methanol). The cyclo-octane (compound "b") is added and the residual methanol is evaporated. The compound "d" (a dispersing agent different from the compound "b" used—for example an octylamine) is then added and the mixture is agitated for 15 minutes at ambient temperature. The silver nanoparticles obtained in this manner in dispersion are directly used for the formulation of conductive inks.

Therefore, the nanoparticles which are used according to the present invention are characterized by values of D50, which are preferably comprised between 1 and 250 nm, whatever their manner of synthesis (physical or chemical); they are also preferably characterized by a monodisperse (homogeneous) distribution without aggregate. Values of D50 comprised between 4 and 15 nm can also be advantageously used for spheroidal silver nanoparticles.

The dispersion obtained in this manner can be used directly or also diluted in order to obtain the desired properties before being incorporated in the ink. However, and this represents a considerable advantage of the dispersions according to the present invention, these dispersions are characterized by a superior stability (before dilution).

According to an embodiment of the present invention the inks comprise in addition to the silver nanoparticles "a" compound of at least one dispersing agent compound "c" and at least one dispersing agent compound "d" different from the compound "c", as well as an optional dispersion solvent compound "b".

The compound "e" present in the ink according to the present invention therefore consists of a mixture of solvents which consists at least of a terpenic alcohol and at least one polyol (and/or a derivative of polyol). More particularly, the compound "e" consists of at least one terpenic alcohol which constitutes at least 15%, for example at least 20% by weight of the ink composition and at least one polyol (and/or a derivative of polyol) which constitutes at least 5% by weight and at the most 30% by weight, for example at the most 25% by weight of the ink composition.

The terpenic alcohol is preferably selected from menthol, nerol, cineol, lavandulol, myrcenol, terpiniol (alpha-, beta-, gamma terpineol, and/or terpinene-4-ol; preferably alpha-terpineol), isoborneol, citronellol, linalol, borneol, geraniol, and/or a mixture of two or more of these alcohols.

The polyol (and/or a derivative of polyol) is preferably characterized by a boiling point lower than 260° C. The following are cited by way of examples: the glycols (for example ethylene glycol, propylene glycol, diethylene glycol, trimethylene glycol, 1,3 butylene glycol, 1,2 butylene glycol, 2,3 butylene glycol, pentamethylene glycol, hexylene glycol, . . . ), and/or the ethers of glycols (for example the mono- or diethers of glycols among which we cite by way of example ethylene glycol propyl ether, ethylene glycol butyl ether ethylene glycol phenyl ether, propylene glycol phenyl ether, diethylene glycol methyl ether, diethylene glycol ethyl ether, diethylene glycol propyl ether, diethylene glycol butyl ether, propylene glycol methyl ether, propylene glycol butyl ether, propylene glycol propyl ether, ethylene glycol dimethyl ether, ethylene glycol diethyl ether, ethylene glycol dibutyl ether, glymes, diethyl ether of diethylene glycol, diethyl ether of dibutylene glycol, diglemes, ethyl diglyme, butyl diglyme), and/or the acetates of glycol ether (for example the acetate of 2-butoxyethyl, diethylene glycol monoethyl ether acetate, diethylene glycol butylether acetate, propylene glycol methyl ether acetate) and/or a mixture of two or more of these previously cited solvents.

According to a preferred embodiment of the present invention the mixture of solvents (compound "e") is characterized by a weight ratio between the terpenic alcohol and the polyol (and/or the derivative of polyol) which is comprised between 1.1 and 10, for example between 1.1 and 6; this weight ratio can also be comprised between 2 and 8, for example between 3 and 6.

The compound "f" according to the present invention therefore consists of a rheology-modifying agent selected from the rheology-modifying agents of the urea type. It is preferably selected from the modified ureas, preferably the polyureas, and/or their mixtures.

The compound "g" according to the present invention therefore consists of a rheology-modifying agent selected from rheology-modifying agents of the cellulose type. The following can be cited by way of example: the alkyl celluloses preferably ethyl cellulose, nitro cellulose, and/or their mixtures.

The optional compound "h" according to the present invention therefore consists of an antioxidant agent. The following are cited by way of example,
- ascorbic acid or vitamin C (E300), ascorbates of sodium (E301), of calcium (E302), diacetyl 5-6-1 ascorbic acid (E303), palmityl 6-1 ascorbic acid (E304);
- citric acid (E330), citrates of sodium (E331) of potassium (E332) and of calcium (E333);
- Tartric acid (E334), tartrates of sodium (E335), potassium (E336) and of sodium and of potassium (E337);
- butyl hydroxy anisole (E320) and butyl hydroxy toluene (E321);
- gallates of octyl (E311) or of dodecyl (E312);
- lactates of sodium (E325), of potassium (E326) or of calcium (E327);
- lecithins (E322);
- natural tocopherols (E306), synthesis of α-tocopherol (E307), synthesis of γ-tocopherol (E308) and synthesis δ-tocopherol (E309), wherein all of the tocopherols form vitamin E;
- eugenol, thymol and/or cinnamaldehyde,
as well as a mixture of two or more of these antioxidants.

According to a particular embodiment of the present invention the ink compositions can also comprise an additional solvent which we will call solvent "X" and which can be advantageously selected from one or more of the solvents for the synthesis of nanoparticles and/or from the previously cited dispersion solvents "b" and/or a mixture of two or more of these solvents. According to an embodiment of the present invention this solvent "X" comprises (or is advantageously selected from) the alkanes and/or their mixtures. According to an embodiment of the present invention this solvent "X" comprises one or several monohydric alcohols, preferably selected from the alcohols with a linear or branched aliphatic radical, for example an alcohol with 1 to 10 carbon atoms. The following are cited by way of illustration: methanol, ethanol, butanol, heptanol, dimethyl heptanol, and/or a mixture of two or more of these alcohols.

A particular example of the preparation of the ink according to the present invention is described below by way of illustration:

A mixture of solvents compound "e" and compound "g" (for example alpha terpineol, ether(s) of glycol and nitrocellulose) are prepared in a reactor; the following are added in the order of optional solvent "X" (for example cyclo-octane and/or a mixture of alkanes), compound "f" (rheology-modifying agent of the urea type) and the compound "a" (preferably in the form of a dispersion of silver nanoparticles).

According to a particular embodiment of the present invention the inks formulated according to the present invention contain a content lower than 70% by weight of silver nanoparticles (compound "a"), preferably between 40 and 70% and more particularly between 45 and 65% by weight.

According to an embodiment of the present invention the silver ink comprises
- a compound "a" (silver nanoparticles) in a content greater than 40% by weight and lower than 65% by weight,
- a compound "e" (terpenic alcohol, polyol and the derivative of polyol) in a content comprised between 30 and 60% by weight, preferably between 33 and 35% by weight, for example between 34 and 50% by weight, and
- a compound "f" (rheology-modifying agent of the urea type) and a compound "g" rheology-modifying agent of the cellulose type) in a global content lower than 20% by weight, preferably between 0.1 and 5% by weight, for example between 0.4 and 1.5% by weight,
- an optional compound "h" (antioxidant agent) in a content lower than 10% by weight, preferably lower than 3% by weight, and
- an optional compound "X" in a content lower than 30% by weight, preferably lower than 20% by weight, for example lower than 15% by weight, lower than 11% by weight, lower by 5% by weight.

According to an embodiment of the present invention the silver ink comprises the compound "h" consisting of an antioxidant agent in a content greater than 0.01% by weight.

According to an embodiment of the present invention the content in compound "f" in the formulation of ink is comprised between 0.1 and 2% by weight.

According to an embodiment of the present invention the content in compound "g" in the formulation of ink is comprised between 0.1 and 5% by weight.

According to an embodiment of the present invention the ink can also integrate into its composition other compounds among which we site by way of example additives (for example, an additive from the family of silanes) whose purpose is to improve the content at different types of mechanical stress, for example, the adherence on numerous substrates; the following substrates can be cited by way of illustration: polyimide, polyethylene terephthalate PET), polyethylene naphthalate (PEN), polyarylether ketone, polyester, thermostabilized polyester, glass, ITO glass, AZO glass, SiN glass.

However, the compounds "a", "b", "c", "d", "e", "f", "g", "h" and "X" (in the ranges of proportions indicated above) preferably constitute at least 85% by weight, preferably at least 90% by weight, for example at least 95% by weight, at least 98% by weight, at least 99% by weight or even 100% by weight of the final ink.

According to a preferred embodiment of the present invention the ink comprises a total content of hydrocarbons (for example the hydrocarbonated solvents of the cyclooctane type and other alkanes, etc. . . . ) lower than 10% by weight.

According to an embodiment of the present invention the ink does not integrate water into its composition. However, as the components of the ink can tolerate traces of water as a function of their degree of purity, it is understood that the sum of these corresponding traces of water are acceptable in the inks according to the present invention. Therefore, the content of water in the final ink depends in general essentially on the content of water of the solvents used for its preparation; monohydric alcohol (the washing methanol of the dispersion in our embodiment above) will have the most significant impact for this reason—by comparison with the other solvents used during the preparation of the ink-on the final content of water of the ink. According to a particular embodiment of the present invention the inks comprise concentrations of water lower than 2% by weight, preferably lower than 1% by weight, for example lower than 0.5% by weight, or even lower than 0.2% by weight.

According to a preferred embodiment of the present invention, with the exception of traces of water possibly present in the compounds of the formulation/preparation of the ink, water is not added during the formulation of the inks.

According to an embodiment of the present invention the preparation of the dispersion of nanoparticles according to the present invention is characterized by the following steps:
  a. synthesis of the silver nanoparticles in the presence of the dispersing agent (compound "c") by a reduction by means of a reducing agent of a precursor of silver;
  b. washing/purification of the nanoparticles obtained in step "a",
  c. addition of the compound "b" and of the compound "d".

According to a preferred embodiment of the present invention a liquid phase is always present during all these preparation steps. In other words, a preferred characteristic according to the present invention consists in that the silver nanoparticles are never isolated and dried; they therefore preferably always remain in contact with a liquid phase (for example a solvent) in which they are dispersed.

According to a preferred embodiment of the present invention, during the step "a" the addition of the reducing agent is carried out in any suitable receiver (for example a reactor) with the characteristic that it is carried out sub-level, for example with the aid of a plunger directly introduced into the reaction environment.

An additional advantage of the dispersion according to the present resides in the fact that its preparation can be carried out under conditions of non-stressful pressure and/or of temperature, for example under conditions of pressure and/or of temperature close to the normal or ambient conditions. It is preferable to remain at at least 40% of the normal or ambient conditions of pressure and, as concerns the temperature, it is generally lower than 80° C., preferably lower than 70° C. For example, the Applicant determined that it was preferable to maintain the conditions of pressure during the preparation of the dispersion at values oscillating at a maximum of 30%, preferably 15% about the normal or ambient conditions of pressure, preferably close to the atmospheric pressure. A monitoring of these conditions of pressure and/or of temperature can therefore be advantageously included in the device for the preparation of the dispersion in such a manner as to fulfil these conditions. This advantage, connected to a preparation of the dispersion under non-stressful conditions, is expressed quite evidently also by a facilitated use of these dispersions.

According to an embodiment of the present invention the preparation of the ink based on nanoparticles according to the present invention is characterized by the following consecutive steps:
  a. introduction of the compound "e" into receiver,
  b. addition of the compound "g",
  c. addition of the compound "f",
  d. addition of the compound "a" and/or of the dispersion according to the present invention.

The ink obtained in this manner can be used directly or also diluted in order to obtain the desired properties.

An additional advantage of the ink according to the present invention resides in the fact that its preparation can be carried out under non-stressful conditions of pressure and/or of temperature, for example under conditions of pressure and/or of temperature close to or identical to the normal or ambient conditions. It is preferable to remain at at least 40% of the normal or ambient conditions of pressure and/or of temperature. For example, the Applicant determined that it was preferable to maintain the conditions of pressure and/or of temperature during the preparation of the ink at values oscillating a maximum of 30%, preferably of 15% about the values of normal or ambient conditions. Therefore, a monitoring of these conditions of pressure and/or temperature can be advantageously included in the device for the preparation of the ink in such a manner as to fulfill these conditions. This advantage, connected to a preparation of the ink under non-stressful conditions, is expressed quite evidently also by a facilitated use of these inks.

According to an embodiment of the present invention the ink can be advantageously be used in serigraphy.

Therefore, it is evident to a person skilled in the art that the present invention allows embodiments in numerous other specific forms in without departing from the area of application of the invention such as it is claimed. Consequently, the present embodiments should be considered by way of illustration but can be modified in the area defined by the scope of the attached claims.

The present invention and its advantages will now be illustrated by means of the formulations listed in the table below. The ink formulations were prepared in conformity with the preferred embodiments described above in the specification. The chemical compounds used are indicated in the second column of the table.

The sheet resistance of the ink such as is mentioned in the present invention can be measured according to any appropriate method. By way of example corresponding to the measures listed in the table it can be advantageously measured according to the following method:

An ink deposited by spin coater on a substrate (2,000 revolutions minute/1 or 3 min—for example of glass) is subjected to an annealing with the aid of a heating plate or of a furnace (150° C.). An analysis of the sheet resistance is made under the following conditions:
Reference of the device: S302 resistivity stand
Reference head 4 point: SP4-40045TFY
Reference current source: Agilent U8001A
Reference multimeter: Agilent U3400
Measuring temperature: ambient temperature
Coefficient of conversion tension/resistance: 4.5324

The content of silver nanoparticles such as mentioned in the present invention can be measured by any appropriate measurement. By way of example corresponding to the measures listed in the table it can advantageously be measured according to the following method:

Thermogravimetric Analysis

| Component | Name | F1 | F2 | F3 | F4 | F5 | F6 | F7 |
|---|---|---|---|---|---|---|---|---|
| "a" | Ag nanoparticles | 55.04 | 55.04 | 55.04 | 55.04 | 55.04 | 55.04 | 55.04 |
| "f" | Polyurea - BYK D-410 | 0.70 | 0.50 | 1.00 | 0.50 | 0.30 | 0.30 | 0.30 |
| "e" | Butyl carbitol | 8.96 | 8.96 | 8.96 | 8.96 | 8.96 | 8.96 | 8.96 |
| "g" | Ethyl cellulose 200 | 0.00 | 0.35 | 0.00 | 0.25 | 0.35 | 0.35 | 0.35 |
| "g" | Ethyl cellulose 45 | 0.35 | 0.00 | 0.35 | 0.00 | 0.00 | 0.00 | 0.00 |
| "e" | Alpha terpineol | 34.95 | 35.15 | 34.65 | 35.25 | 35.25 | 34.35 | 34.35 |
| "h" | Citric acid | 0.00 | 0.00 | 0.00 | 0.00 | 0.00 | 1.00 | 0.00 |
| "h" | Eugenol | 0.00 | 0.00 | 0.00 | 0.00 | 0.00 | 0.00 | 1.00 |
| | Total | 100.00 | 100.00 | 100.00 | 100.00 | 100.00 | 100.00 | 100.00 |
| | sheetR (mΩ/sq) | 80.00 | 51.00 | 184.00 | 66.00 | 61.00 | Not measured | Not measured |
| | Thickness (μm) | 2.73 | 2.60 | 2.40 | 2.21 | 1.27 | Not measured | Not measured |
| | Viscosity (cP) | 1324-1042 (40 and 100 s$^{-1}$) | 1524-1172 (40 and 100 s$^{-1}$) | 1325-1025 (40 and 100 s$^{-1}$) | 974-767-411 (40 and 100 s$^{-1}$) | 1572-1196-569 (40 and 100 s$^{-1}$) | Not measured | Not measured |

Device: TGA Q50 of TA Instrument
Crucible: alumina
Method: ramp
Measuring range: from ambient temperature to 600° C.
Rise in temperature: 10° C./min.

The distribution of the sizes of the silver nanoparticles such as mentioned in the present invention can be measured according to any appropriate method. By way of example, it can advantageously be measured according to the following method: using a device of the Nanosizer S of Malvern type with the following characteristics:
Measuring Method DLS (Dynamic Light Scattering):
  Type of vat: optical glass
  Material: Ag
  Refraction index of the nanoparticles: 0.54
  Absorption: 0.001
  Dispersion: cyclo-octane
  Temperature: 20° C.
  Viscosity: 2.133
  Refraction index dispersant: 1.458
  Gen. options: Mark-Houwink parameters
  Analysis model: general purpose
  Equilibration: 120 s
  Measuring name: 4
D50 is the diameter for which 50% of the silver nanoparticles in number are smaller. This value is considered as representative for the average size of the grains.

The viscosity of the ink such as mentioned in the present invention can be measured according to any appropriate method. By way of example, it can be advantageously measured according to the following method:
Apparatus: Rheometer AR-G2 of TA Instrument
  Conditioning time: pre-shearing at 100 s$^{-1}$ for 3 minutes/equilibration for 1 minute
Test type: shearing level
Levels: 40 s$^1$, 100 s$^1$ and 1,000 s$^1$
Duration of a level: 5 minutes
Measuring: every 10 seconds
Temperature: 20° C.
Method of reprocessing the curve: Newtonian
Reprocessed zone: the entire curve Table formulations—seven ink formulations in conformity with the present invention are described in the table below.

The butyl Carbitol™ corresponds to diethylene glycol monobutyl ether.

The inks are characterized by an improved viscosity as well as a behavior simultaneously shear thinning and thixotropic; this combination, which was unexpected and greater than their properties makes these inks particularly adapted for the area of serigraphy.

The ink compositions according to an embodiment of the present invention are characterized in that their value of the property of sheet resistance is lower than 300 mohms/sq for thicknesses greater than or equal to 1 μm (annealing temperature of 250° C.): for example, a value of the property of sheet resistance lower than 2 mohms/sq for thicknesses equal to 25 μm (annealing temperature of 250° C.).

Figure 1:
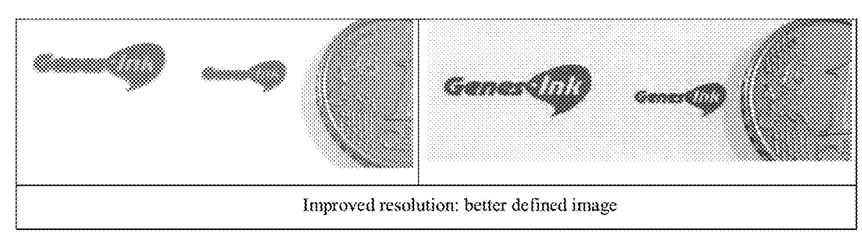
FIG. 1 is an image comparing printing with different ink formulations.

FIG. 1 shows a good example of visualizing the advantages added by the present invention; an improvement of the resolution between the formulations F3 (left) and F5 (right) by modifying the nature and the content of the rheology additives is observed.

The ink compositions according to the present invention can also be advantageously used at a temperature lower than 60° C., preferably lower than 40° C., lower than 30° C., for example at ambient temperature.

The formulation F5 has been tested in this sense by the "doctor blade" method described below, which showed superior measures of sheet resistance whose values were respectively 5, 1 and 0.2 Ω/sq after 5 h, 24 h and 2 months.

Therefore, the ink compositions according to an embodiment of the present invention are also characterized in that their value of the property of sheet resistance is lower than 300 mohms/sq for thicknesses greater than or equal to 1 μm (drying temperature at ambient temperature), for example, a value of the property of sheet resistance lower than 15 mohms/sq for thicknesses equal to 25 μm (drying temperature at ambient temperature).

This sheet resistance of the ink such as deposited at ambient temperature can be measured by any appropriate method. By way of example corresponding to the three measurements above, it can be advantageously measured according to the following method:

An analysis of the sheet resistance is made under the following conditions:
Reference of the device: S302 resistivity stand
Reference head 4 point: SP4-40045TFY
Reference current source: Agilent U8001A
Reference multimeter: Agilent U3400
Measuring temperature: ambient temperature
Coefficient of conversion tension/resistance: 4.5324

The details of the "doctor blade" method used for the depositing of the ink F5 are the following:
Equipment used: doctor blade of the Erichsen brand, model 409.
Depositing of 4 μm (before drying) by means of the Barre coater of the doctor blade
Depositing rate: 15 mm/s
Substrate used: PET Melinex ST 504

Protocol: Once the substrate is placed on the doctor blade, 2 ml of ink are deposited on the substrate before the barre coater. The barre coater is then moved 15 cm at the previously cited rate. The deposition obtained in this manner (at ambient temperature) is also dried at ambient temperature.

The formulation F5 was also advantageously tested for its properties of adherence on the substrate, which proved to be excellent. This test can be carried out by any appropriate method. By way of example, it was carried out in conformity with the following details:
Scotch Tape Test Description:
Normalized Scotch Tape
A piece of Scotch tape (of 5 mc) is placed on the deposit/substrate interface.
The Scotch tape is then removed at a constant speed (2 cm/s).

The evaluation of the adherence is made by analyzing the deposition residues which are transferred from the substrate to the Scotch tape. No transfer of material was observed.

The invention claimed is:

1. A composition of ink based on nanoparticles of silver comprising,
   1. a compound "a" consisting of silver nanoparticles,
   2. compounds "e" consisting of a mixture of solvents,
   3. at least one compound "f" or "g" selected from
      a. a compound "f" consisting of a modified urea or polyurea rheology-modifying agent, and
      b. a compound "g" consisting of an alkyl cellulose or nitro cellulose rheology-modifying agent, or a mixture thereof,
   4. an optional compound "c" consisting of a dispersing agent,
   5. an optional compound "d" consisting of a dispersing agent different from the compound "c",
   6. an optional compound "b" consisting of a cyclo-octane solvent, a solvent of the ester methyl type of fatty acids, or a mixture thereof, and
   7. an optional compound "h" consisting of an antioxidant agent in a content lower than 10% by weight, and
   8. an optional additional solvent "X,
   wherein
      A. the compound "a" constitutes at least 40% by weight of the ink composition,
      B. the compounds "e" consist of
         at least one terpenic alcohol which constitutes at least 20% by weight of the ink composition, and
         of at least one polyol, a derivative of polyol, or a mixture thereof which constitutes at least 5% by weight and at the most 25% by weight of the ink composition, and
      C. the sum of the compounds "a", "b", "c", "d", "e", "f", "g" and "X" constitutes at least 85% by weight of the ink composition.

2. The composition of ink according to claim 1, wherein the mixture of solvents is characterized by a weight ratio between the terpenic alcohol and the polyol, the derivative of polyol, or the mixture thereof which is comprised between 1.1 and 10.

3. The composition of ink according to claim 1, wherein the mixture of solvents is characterized by a weight ratio between the terpenic alcohol and the polyol, the derivative of polyol, or the mixture thereof which is comprised between 1.1 and 6.

4. The composition of ink according to claim 1, wherein the compounds "e" comprise a glycol ether.

5. The composition of ink according to claim 1, wherein
   the compound "a" is in a content greater than 40% by weight and lower than 65% by weight,
   the compounds "e" are in a content comprised between 30 and 60% by weight, and
   the compound "f" and the compound "g" are in a content lower than 20% by weight,
   the optional compound "h" in a content lower than 10% by weight, and
   the optional compound "X" in a content lower than 30% by weight.

6. The composition of ink according to claim 5, wherein the compound "f" and the compound "g" are in a content comprised between 0.1 and 5% by weight.

7. The composition of ink according to claim 5, wherein the compound "f" and the compound "g" are in a content comprised between 0.4 and 1.5% by weight.

8. The composition of ink according to claim 1, wherein the compound "f" has a content comprised between 0.1 and 2% by weight and the compound "g" has a content comprised between 0.1 and 5% by weight.

9. The composition of ink according to claim 4, wherein the glycol ether is selected from ethylene glycol propyl ether, ethylene glycol butyl ether ethylene glycol phenyl ether, propylene glycol phenyl ether, diethylene glycol methyl ether, diethylene glycol ethyl ether, diethylene glycol propyl ether, diethylene glycol butyl ether, propylene glycol methyl ether, propylene glycol butyl ether, propylene glycol propyl ether, ethylene glycol dimethyl ether, ethylene glycol diethyl ether, ethylene glycol dibutyl ether, glymes, diethyl ether of diethylene glycol, diethyl ether of dibutylene glycol, diglemes, ethyl diglyme, butyl diglyme, or a mixture thereof.

10. The composition of ink according to claim 1, wherein sheet resistance value is lower than 300 mohms/sq for thicknesses greater than or equal to 1 μm with an annealing temperature of 250° C.

11. The composition of ink according to claim 1, wherein sheet resistance value is lower than 300 mohms/sq for thicknesses greater than or equal to 1 μm with a drying temperature at ambient temperature.

12. The composition of ink according to claim 1, wherein the composition of ink comprises a water content lower than 2% by weight.

13. The composition of ink according to claim 1, wherein the composition of ink comprises a water content lower than 0.5% by weight.

14. The composition of ink according to claim 1, wherein the compound "a" has values of D50 comprised between 1 and 250 nm.

15. The composition of ink according to claim 1, wherein the rheology-modifying agent of compound "f" is a polyurea.

16. The composition of ink according to claim 1, wherein the rheology-modifying agent of compound "g" is selected from alkyl celluloses, ethyl cellulose, nitro cellulose, or a mixture thereof.

17. The composition of ink according to claim 1, wherein the sum of the compounds "a", "b", "c", "d", "e", "f", "g" and "X" constitutes at least 99% by weight of the ink composition.

18. The composition of ink according to claim 1, wherein the total content of hydrocarbons is lower than 10% by weight of the ink composition.

* * * * *